R. Hartley,
Double-Acting Pump.

Nº 56,218.                    Patented July 10, 1866.

Witnesses.                                    Inventor.

UNITED STATES PATENT OFFICE.

ROGER HARTLEY, OF PITTSBURG, PENNSYLVANIA.

IMPROVEMENT IN PUMPS.

Specification forming part of Letters Patent No. 56,218, dated July 10, 1866.

*To all whom it may concern:*

Be it known that I, ROGER HARTLEY, of the city of Pittsburg, in the county of Allegheny and State of Pennsylvania, have invented a new and Improved Pump; and I do hereby declare that the following is a full and exact description thereof, reference being had to the accompanying drawings, forming part of this specification, in which—

Figure 1:
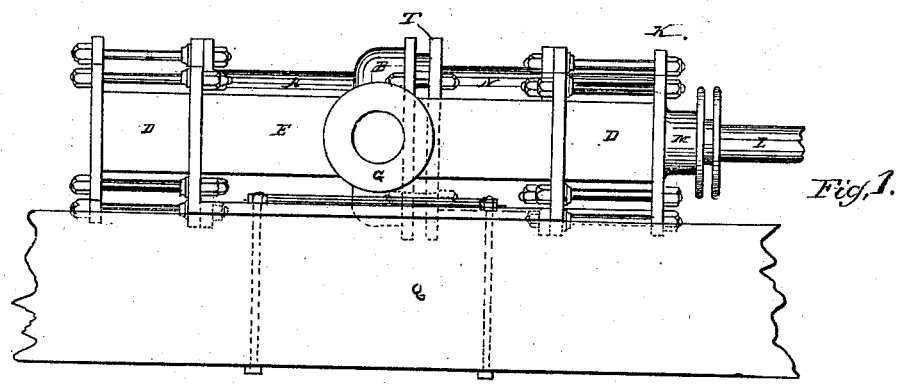
Figure 2:
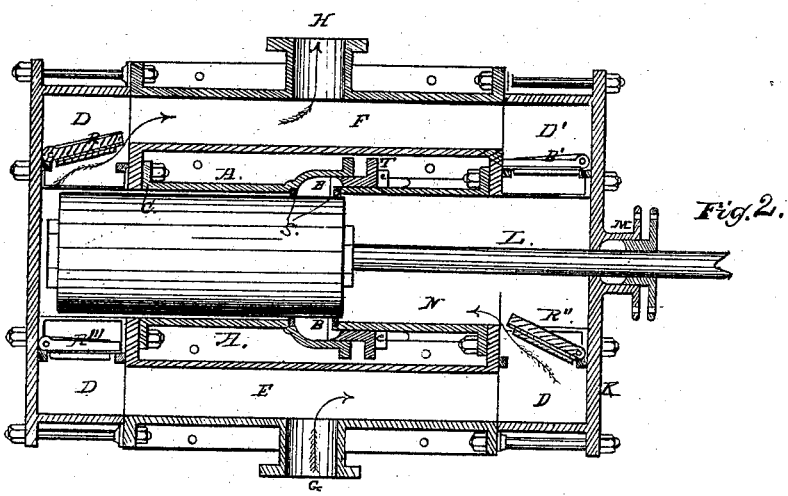

Figure 1 represents a side view of my improved pump; and Fig. 2 represents a sectional view of the same, in plan, and through its longitudinal center.

My invention relates to that class of double-acting pumps which have a plug-piston and where the packing is made by a ring fastened to the central part of the cylinder; and it consists in the construction of that cylinder and of the packing or stuffing box, which I will describe more fully, to enable others skilled in the art to construct it and put it in operation.

A is a cylinder, having an enlarged place, B, for receiving packing at one end and a flange, C, at the other end, for bolting the cylinder A to the valve-box D. E and F are pipes for uniting the two valve-boxes D and D'.

G is the branch pipe by which the water enters the pump, and H is the branch pipe by which the water is discharged from the pump.

D is the front valve-box, which is bolted on one side to the pipes E and F, and which is closed on the other side by a lid, $k$, having in its center a stuffing-box, M, through which the rod L passes.

P is the piston, which is turned true and perfectly cylindrical on its outside, and is made fast to the rod L.

N is a cylinder, which is straight at one end, and which has a flange, $n$, at the other end, for the purpose of bolting it to the valve-box D'.

R R' R'' R''' are the four valves, as in any double-acting plug-piston pump, and Q is the block to which the pump is bolted.

T is a gland which slips over the cylinder N, and which enters inside of the stuffing-box of the cylinder A. This gland T is drawn toward the flange of the stuffing-box B by the bolts $e\ e\ e$, which pass through that flange, and also through the flange of the gland T; and when these bolts are tightened the gland is drawn in the stuffing-box B in the same way as ordinary stuffing-boxes, except that the cylinder N remains between the gland T and the piston P.

At the end of the cylinder N and at the bottom of the stuffing-box B there are two brass rings, S S, which are fitted in grooves made for that purpose, and which serve the purpose of keeping the rings S S in place. These rings S S will keep the piston P in its proper place as it slips backward and forward; and, also, they will confine the packing and prevent it from being drawn in the cylinders A or N by the motion of the piston P.

For packing my pump-piston the gland T is drawn away from the cylinder A, the packing is wound around the outside of the cylinder N, and pushed inside of the box B until that box is full, when the gland T is pushed over the packing and drawn in by the insertion of the bolts $e\ e\ e$.

The advantage which I derive from this mode of construction of pump is obvious. It is not necessary to take apart any portion of the pump for packing it, the packing being done entirely from the outside, and there can never be any danger of the pump sucking air, for as the pressure in one of the cylinders will always be greater than the vacuum in the other cylinder, if any water is forced outside of one cylinder it will be drawn in the other, instead of air, so that the only effect of a leaky packing would be a small quantity of water, which would pass from one cylinder to the other without destroying the vacuum.

The operation of my pump is easily understood. When the piston travels in the direction of the arrow the pressure in the cylinder A will close the valve R''', and force the water out by the valve R, while in the cylinder N it will create a vacuum, which will close the valve R' and suck water through the valve R″ out of the pipe E. When the piston is made to move in the opposite direction the action of the valves will be reversed.

What I claim as my invention, and desire to secure by Letters Patent of the United States, is—

In double-acting plug-plunger pumps, the combination of the cylinder A, having a stuffing-box, B, with the cylinder N and the gland T, constructed and arranged as described, and for the purpose specified.

ROGER HARTLEY. [L. S.]

Witnesses:
 CAMILLE DEY,
 C. H. P. GUNGEMBRE.